(12) United States Patent
Hu et al.

(10) Patent No.: US 11,625,608 B2
(45) Date of Patent: *Apr. 11, 2023

(54) METHODS AND SYSTEMS FOR OPERATING APPLICATIONS THROUGH USER INTERFACES

(71) Applicant: Aivitae LLC, Redwood City, CA (US)

(72) Inventors: Bob Sueh-Chien Hu, Los Altos Hills, CA (US); Steven Chen Reiley, San Francisco, CA (US)

(73) Assignee: Aivitae LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,909

(22) Filed: Jun. 22, 2021

(65) Prior Publication Data

US 2021/0312292 A1 Oct. 7, 2021

Related U.S. Application Data

(63) Continuation of application No. 16/778,397, filed on Jan. 31, 2020, now Pat. No. 11,068,785.

(60) Provisional application No. 62/824,027, filed on Mar. 26, 2019.

(51) Int. Cl.
| | | |
|---|---|---|
| G06N 3/08 | (2006.01) | |
| G06F 3/0487 | (2013.01) | |
| G06T 7/73 | (2017.01) | |
| G06F 3/0484 | (2022.01) | |
| G06N 3/082 | (2023.01) | |
| G06F 3/04842 | (2022.01) | |

(52) U.S. Cl.
CPC .......... *G06N 3/082* (2013.01); *G06F 3/0487* (2013.01); *G06F 3/04842* (2013.01); *G06T 7/75* (2017.01); *G06T 2207/20081* (2013.01); *G06T 2207/20084* (2013.01)

(58) Field of Classification Search
CPC .................... G06N 3/082; G06T 7/175; G06T 2207/20081; G06T 2207/20084; G06F 3/04842; G06F 3/0487
See application file for complete search history.

(56) References Cited

U.S. PATENT DOCUMENTS

| | | | | |
|---|---|---|---|---|
| 10,043,255 | B1 * | 8/2018 | Pathapati | ............... G06N 20/00 |
| 10,175,697 | B1 * | 1/2019 | Sachdeva | ............ G06F 3/04845 |
| 2017/0301015 | A1 * | 10/2017 | Tunnell | .................. G06Q 40/04 |
| 2019/0171467 | A1 * | 6/2019 | Hermosillo Valadez | ..................... G06K 9/6201 |
| 2019/0250891 | A1 * | 8/2019 | Kumar | .................. G06K 9/6218 |
| 2021/0390702 | A1 * | 12/2021 | Juillard | ..................... G06T 7/90 |

* cited by examiner

*Primary Examiner* — Sang H Kim
(74) *Attorney, Agent, or Firm* — Perkins Coie LLP

(57) ABSTRACT

Methods and systems are disclosed for improved operation of applications through user interfaces. In some embodiments, the methods and systems relate to training an artificial neural network to complete a task within an application by mimicking and emulating interactions of human operators with the application interface.

20 Claims, 10 Drawing Sheets

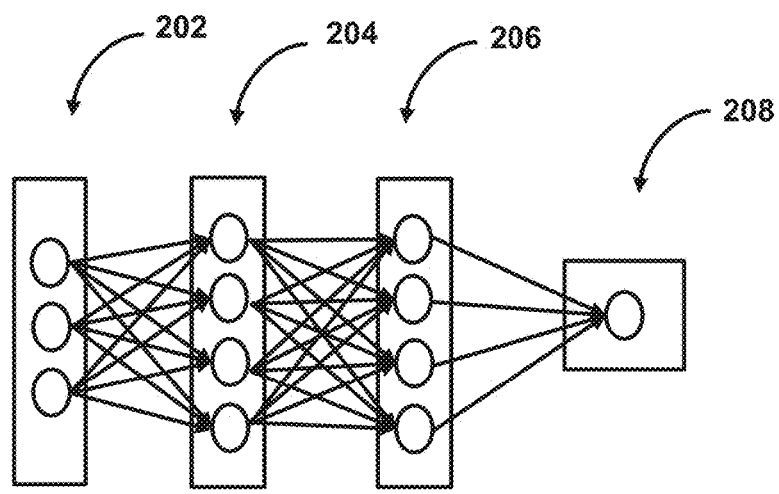
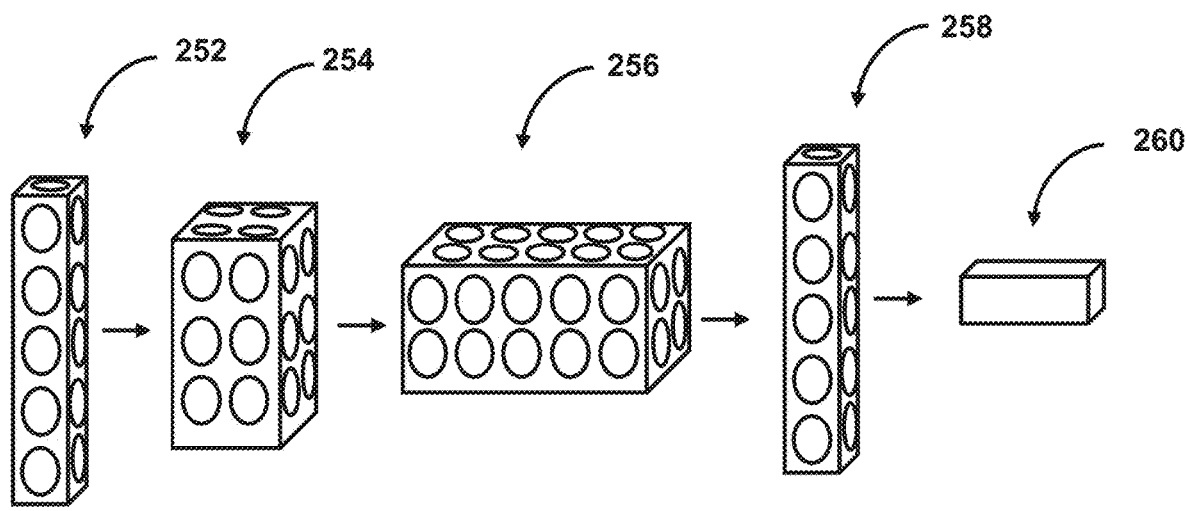
FIG. 2

700

702
Receive a first image of a user interface of an application

704
Label the first image with a known instance of the user interface

706
Train an artificial neural network to detect the known instance based on the labeled first image

708
Receive a second image of the user interface

710
Input the second image into the trained neural network

712
Receive an output from the trained neural network identifying the second image as corresponding to the known instance

802
Receive a task to be completed in an application, wherein the task comprises a series of operations that are entered into a user interface of the application

804
Determine a first operation in the series of operations

806
Determine a first instance of the user interface that corresponds to the first operation

808
Receive a first image of the user interface

810
Input the first image into a trained artificial neural network to identify an instance of a plurality of instances in the user interface corresponding to the first image

812
In response to receiving an output from the trained neural network identifying the first image as corresponding to the first instance, perform the first operation

902
Label a first object in the known instance with a known object

904
Train the artificial neural network to detect the known object based on the labeled first image

906
Label a first operation corresponding to a selection of the first object with a known operation

908
Train the artificial neural network to detect the known operation based on the labeled first image

1002
Retrieve a first node for a first instance and a second node for a second instance

1004
Determine a first path of the plurality of paths, wherein the first path comprises one or more operations that cause the application to transition from the second instance to the first instance

1006
Determine the second operation is included in the one or more operations that cause the application to transition from the second instance to the first instance

FIG. 10

METHODS AND SYSTEMS FOR OPERATING APPLICATIONS THROUGH USER INTERFACES

CROSS REFERENCE TO RELATED APPLICATIONS

This application is a continuation of U.S. patent application Ser. No. 16/778,397, filed Jan. 31, 2020, which claims priority to U.S. Provisional Patent Application No. 62/824,027, filed Mar. 26, 2019, which are hereby incorporated by reference in its entirety.

FIELD OF THE INVENTION

The invention relates to methods and systems for operating applications through user interfaces.

BACKGROUND

Advancements in artificial intelligence ("AI") have expanded rapidly. However, while these systems continue to perform new and complex tasks, these systems still act and solve problems as a computer would. That is, these systems still train and operate through processing data (e.g., binary data values) that would be incomprehensible to a human operator.

SUMMARY

In conventional systems, computer learning systems are still trained and operated through processing data that would be incomprehensible to a human operator. This presents a problem to human operators that wish to work in tandem with AI systems, as the human operators do not know what the system is doing. That is, while the AI system is performing operations to solve a problem, the human operator cannot follow the operations to ensure that they are performed correctly, without bias, and accordingly to predetermined rules or regulations. For example, a doctor may wish to have an AI system perform an MRI scan, but may need to follow along with the scanning process in order to ensure that the system follows the proper procedure. In another example, a Microsoft Word user may need an AI system to proofread a document but may wish to follow along to ensure that the system does not change the meaning of the document. In another example, a user operating an autonomous vehicle may wish to monitor the operation of the vehicle by the AI system to correct for any errors and ensure safety precautions are being taken.

In view of the aforementioned problems, methods and systems for operating applications through user interfaces are disclosed herein. In particular, methods and systems for operating applications through user interfaces that themselves are operated by an artificial intelligence are discussed herein. For example, a neural network may be able to learn to navigate the user interface of an MRI scanner such that, when given a command, it is able to perform the steps that a human would perform in conducting an MRI scan. The neural network may perform these steps in order and at such a pace that a human (e.g., a doctor) may observe and follow along. In another example, a neural network may learn the operations of the user interface of Microsoft Word such that, when given a task (e.g., proofreading a document), it can complete the steps that a user typically completes. The user is able to follow along with the proofreading process and may step in if the situation requires. In another example, a neural network may learn to operate an autonomous vehicle. The driver of the vehicle may follow along with the operations of the neural network via a user interface of the vehicle, allowing the user to ensure that the vehicle is operated correctly.

In some aspects, the system may receive a first image of a user interface of an application. The control circuitry may then generate a first pixel array based on the first image. The control circuitry may label the pixel array with a known instance of the user interface (e.g., start screen, print screen, design menu, or any other instance). The control circuitry may then train an artificial neural network (ANN) to detect the known instance based on the labeled first pixel array. Thus, the labeled first pixel array acts as training data for the ANN. The control circuitry may receive a task to be completed in an application, wherein the task comprises a series of operations that a user or a system enters into the user interface of the application. Examples of tasks include printing a document, navigating to a test results screen of a website, performing a medical scan, operating an autonomous vehicle, or any other task to be completed in an application. The control circuitry determines a first operation in the series of operations. For example, in order to print a document, the system may first need to open a "File" menu. In another example, in order to navigate to a test results screen of a website, the system may first need to enter login credentials of the user. The control circuitry may determine that the known instance of the user interface corresponds to the first operation. For example, the known instance may comprise an object which corresponds to the first operation (e.g., "File" icon, login screen, etc.).

The system may then receive a second image of the user interface and generate a second pixel array based on the second image. The system may input the second pixel array into the trained ANN and receive an output from the trained ANN identifying the second pixel array as corresponding to the known instance. For example, the second pixel array may match the first pixel array or may otherwise correspond to the first pixel array. In response to receiving the output from the trained ANN, the system may perform the first operation.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 2 shows an illustrative diagram for an artificial neural network, in accordance with some embodiments.

FIG. 7 shows a flowchart of illustrative steps for operating computer applications based on information displayed in user interfaces, in accordance with some embodiments.

FIG. 8 shows a flowchart of illustrative steps for operating computer applications based on information displayed in user interfaces, in accordance with some embodiments.

FIG. 9 shows a flowchart of illustrative steps for identifying objects and the operations associated with the objects in an instance of a user interface, in accordance with some embodiments.

FIG. 10 shows a flowchart of illustrative steps for identifying a series of operations for performing a task, in accordance with some embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 1:
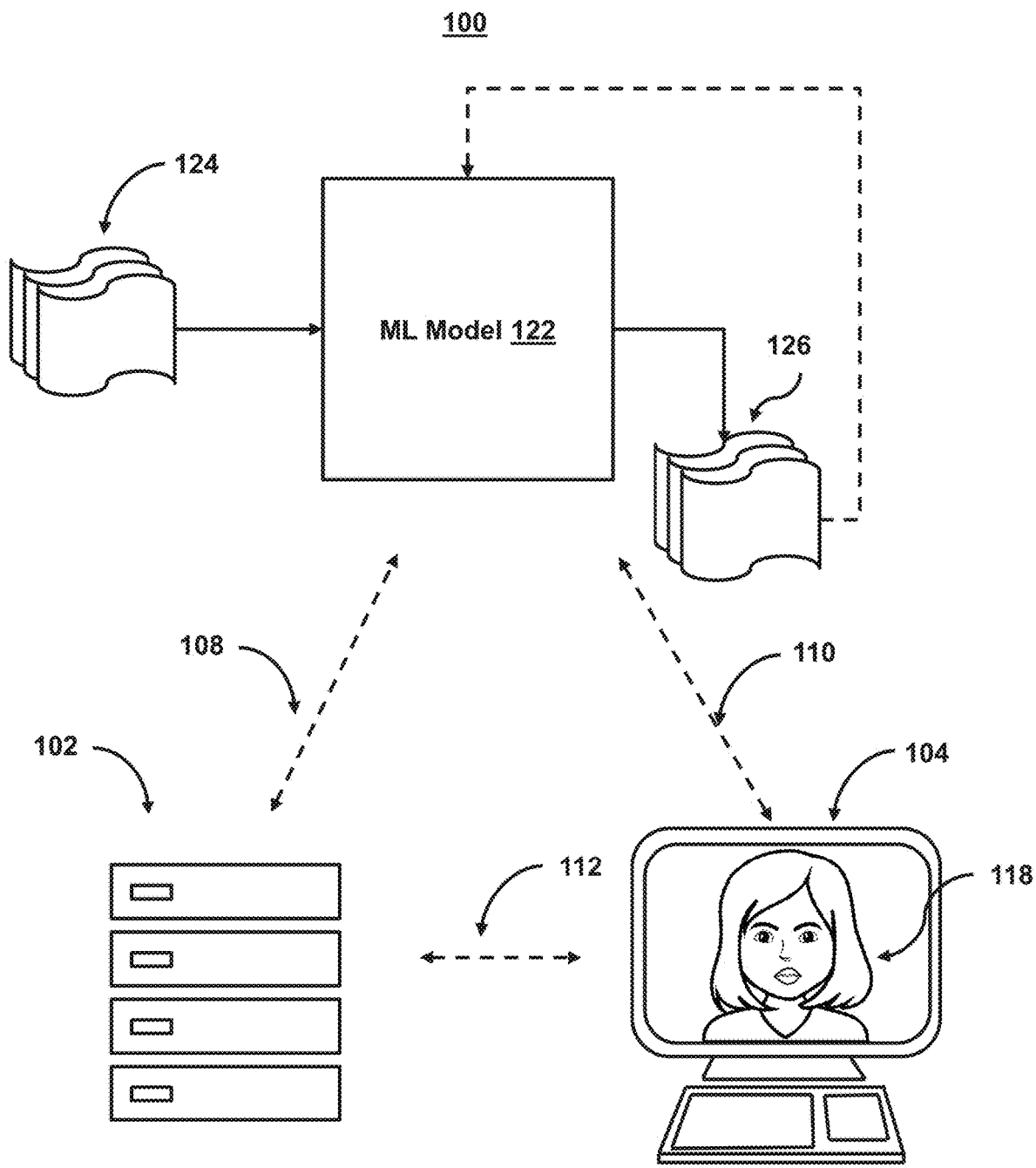
FIG. 1 shows a system diagram for operating computer applications based on information displayed in user interfaces, in accordance with some embodiments.

FIG. 1 shows a system diagram for operating computer applications based on information displayed in user interfaces, in accordance with one or more embodiments. As shown in FIG. 1, system 100 may include host device 102, host device 104 or other components. Each of host devices 102 and 104 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, host devices 102 and 104 may include a desktop computer, a server, or other client device. Users may, for instance, utilize one or more host devices 102 and 104 to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of host device 102, those operations may, in some embodiments, be performed by components of host device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 100 may use one or more prediction models for operating computer applications based on information displayed in user interfaces. For example, as shown in FIG. 1, system 100 may predict operations required to perform a task using machine learning model 122. The determination may be shown as output 118 on host device 104. The system may include one or more neural networks (e.g., as discussed in relation to FIG. 1) or other machine learning models.

As an example, with respect to FIG. 1, machine learning model 122 may take inputs 124 and provide outputs 126. The inputs may include multiple data sets such as a training data set and a test data set. For example, a training data set may include a set of data including labeled data that is used to train machine learning model 122. A test data set may include a set of data used to assess the performance of the machine learning model 122 once it has been trained. The data sets may represent instances and objects encountered while operating a user interface. As referred to herein, a user interface may refer to a human user interface, i.e., the interface with which a human operator interacts. As referred to herein, an instance may include any state or display, whether transitory or non-transitory, of a user interface. For example, an instance may include a screenshot of a user interface. Each instance may include one or more objects. As referred to herein, an object may represent a graphical entity and may be associated with an operation of the application. For example, objects may be images, text, links, text boxes, icons, buttons, or any other entities. In some embodiments, the identity, position, boundaries, and operations associated with these objects may depend on the current instance. As referred to herein, an operation may refer to an action that occurs in response to an interaction with the object. For example, an operation may be to cause the application to refresh, transition to a different instance, quit, open a menu, or any other action. In some embodiments, a user may operate an application in order to perform a task. As referred to herein, a task may refer to an action comprising a series of operations that a user or a system enters into the user interface of the application.

In one use case, the system may feed outputs 126 back to machine learning model 122 as input to train machine learning model 122 (e.g., alone or in conjunction with user indications of the accuracy of outputs 126, labels associated with the inputs, or with other reference feedback information). In another use case, machine learning model 122 may update its configurations (e.g., weights, biases, or other parameters) based on its assessment of its prediction (e.g., outputs 126) and reference feedback information (e.g., user indication of accuracy, reference labels, or other information). In another use case, where machine learning model 122 is a neural network, the system may adjust connection weights to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after the system has completed a forward pass. In this way, for example, the system may train the machine learning model 122 to generate better predictions.

The system may train machine learning model 122 to recognize tasks performable through a user interface. For example, host device 102 or 104 may generate an image of an instance of the user interface (e.g., via a screen capture), generate a first pixel array based on the image of the instance, and label the image (or first pixel array). For example, machine learning model 122 may have classifications for various digital objects and instances that may exist within a user interface. The system then trains machine learning model 122 based on a first data set (e.g., data of known objects and instances) to classify an unknown object or instance.

The system may then receive a second image of the user interface (e.g., a second instance of the user interface and/or a digital object encountered within the user interface). The system may generate a second pixel array based on the second image and input the second pixel array into machine learning model 122. The system may then receive an output from machine learning model 122 indicating that the second object is the same as the first. For example, the system may input a second image into machine learning model 122. Machine learning model 122 may then classify the objects in the second image. For example, a home button, file button, options button, save button, print button, or any other object may be a first classification of machine learning model 122, and the system may generate an output from machine learning model 122 that the second object is the same as the first object based on matching the second pixel array to the first classification.

In some embodiments, system 100 is further configured to perform one or more operations based on the output. For example, the system may autonomously navigate a vehicle, perform an MRI scan, and/or proofread a document.

FIG. 2 shows an illustrative diagram for an artificial neural network, in accordance with one or more embodiments. Model 200 illustrates an artificial neural network. Model 200 includes input layer 202. The system may input an image (e.g., screenshot of an instance of a user interface) into model 200 at this level. Model 200 also includes one or more hidden layers (e.g., hidden layer 204 and hidden layer 206). Model 200 may be based on a large collection of neural units (or artificial neurons). Each neural unit of a model 200 may be connected with many other neural units of model 200. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 200 may be self-learning and trained, rather than explicitly programmed, and can perform significantly better in certain areas of problem solving, as compared to traditional computer applications. During training, output layer 208 may correspond to a classification of model 200 (e.g., whether or not a given image corresponds to a particular instance) and the system may feed an input known to correspond to that classification into input layer 202.

In some embodiments, model 200 may include multiple layers (e.g., where a signal path traverses from front layers to back layers). In some embodiments, the system may utilize back propagation techniques by model 200 where the system uses forward stimulation to reset weights on the "front" neural units. In some embodiments, stimulation and inhibition for model 200 may be more free flowing, with connections interacting in a more chaotic and complex fashion. Model 200 also includes output layer 208. During testing, output layer 208 may indicate whether or not a given input corresponds to a classification of model 200 (e.g., whether or not a given image corresponds to a particular object).

FIG. 2 also includes model 250, which is a convolutional neural network. The convolutional neural network is an artificial neural network that features one or more convolutional layers. Convolution layers extract features from an input image. Convolution preserves the relationship between pixels by learning image features using small squares of input data. For example, the relationship between the individual portions of an image. As shown in model 250, input layer 252 may proceed to convolution blocks 254, 256, and 258 before proceeding to convolutional output 260. In some embodiments, model 250 may itself serve as an input to model 200.

With respect to operating computer applications based on information displayed in user interfaces, the system may also adjust model 250 to improve performance. For example, model 250 may undergo weight pruning such that the system measures each weight and removes unimportant weights. Notably, the loss of this data does not affect overall accuracy as information contrasts well with portions of data without information. Similarly, sparse convolutional neural networks, in particular submanifold sparse convolutional networks, also perform well in related applications. The system obtains maximum sparsity by exploiting both inter-channel and intra-channel redundancy, with a fine-tuning step that minimizes the recognition loss caused by maximizing sparsity. It should also be noted that embodiments discussed herein may also be used with (other/any) deep learning, machine learning or differentiable programming architecture, including CNN-LSTMs, and spiking neural networks designed to work with event-based sensor data streams.

Figure 3:
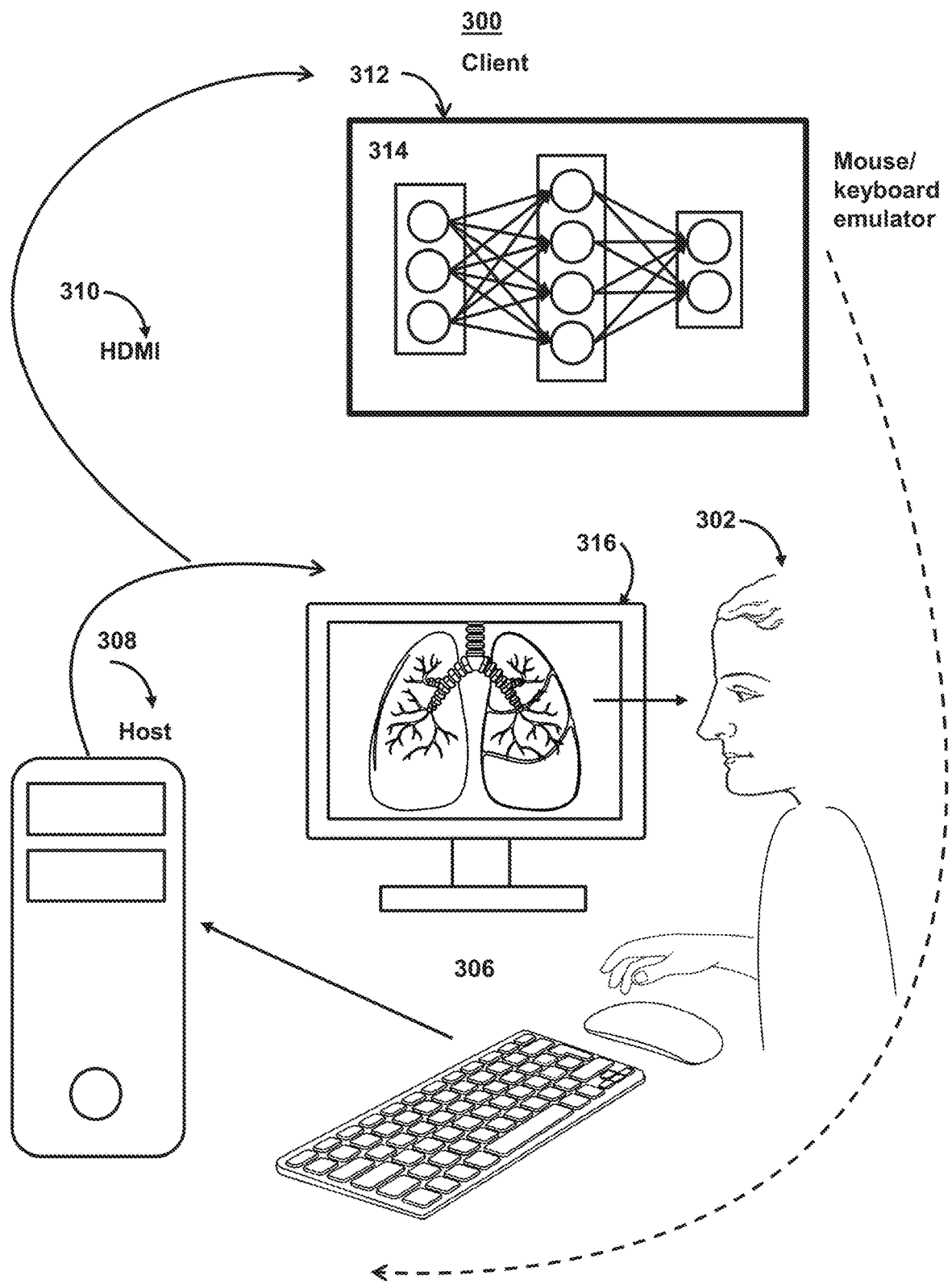
FIG. 3 shows a system for training an artificial neural network to navigate a user interface, in accordance with some embodiments.

FIG. 3 shows a system 300 for training an artificial neural network to navigate a user interface, in accordance with some embodiments. As shown in FIG. 3, a user (e.g., user 302) may interact with a host device (e.g., host device 308). In some embodiments, host device 308 may include a human interface device (HID) (e.g., HID 306). HID 306 may comprise a mouse, keyboard, microphone, touch screen, buttons, steering mechanisms, or any other interface devices from which the host system is expecting input for control of the host system. In some embodiments, host device 308 may be a personal computer setup, MRI scanner, autonomous vehicle, or any other device with which a user can interact. A client device (e.g., client device 312) comprising a system featuring an artificial neural network (e.g., ANN 314) may connect to host device 308. Client device 312 may connect to host device 308 via an HDMI connection (e.g., HDMI 310), a USB connection, a Wi-Fi connection, a Bluetooth connection, or any other wired or wireless connection. In some embodiments, client device 312 may mirror the display of host device 308.

In some embodiments, client device 312 may be a small, separate computer on which the ANN operates. The client device may be separate from the host device so that the client device is not constrained by the technological limitations of the host device. For example, the host device may have limited functionality, slow processing speeds, limited storage, or any other constraint. In addition, having the client device connected but separate allows the client device to receive and send information without requiring installation directly on the host device, which may be intrusive and difficult and may raise security issues.

In some embodiments, the system may feed various training data sets into ANN 314. The training data sets may comprise labeled images of various instances of the interface of host device 308. In some embodiments, client device 312 may store the training data set in memory. For example, ANN 314 may receive an image of a start screen of an MRI application along with the label "MRI start." If ANN 314 receives an image in the future which matches (or otherwise corresponds to) this image, ANN 314 may retrieve the label ("MRI start") from the image in the training data set. The system therefore trains ANN 314 to identify images which share characteristics with previously encountered, labeled images.

The system implemented on, or accessible to, client device 312 may include a keylogger that identifies input received from a user via one or more interface devices. The keylogger, which may be a software or hardware component, may record these interactions to either train the ANN or operate applications through user interfaces. For example, the keylogger may track information (e.g., username and password) that a user enters into a particular instance (e.g., a login page) of the interface. Client device 312 may store the username and password tracked by the keylogger in memory and associate this information with the login page. When operating the application, upon recognizing an instance which matches the stored login page (e.g., via ANN 314), client device 312 may retrieve the associated username and password from memory. Client device 312 may then send the username and password to the host device 308 along with a command to emulate keystrokes for entering the username and password into the login page.

In some embodiments, when training ANN 314, the system determines objects and corresponding operations associated with the present interface of the application. For example, ANN 314 may record which objects the system interacts with and which operations occur in response to these interactions. In some embodiments, the client device 312 may store the objects and corresponding operations associated with each instance of the interface in memory. In some embodiments, there may be more than one interaction associated with each instance of the interface. For example, client device 312 may store several sets of interactions for each instance of the interface, such as "access menu," "log into account," and other interactions, each of which comprises various keystrokes, objects, and operations. ANN 314 may thus recognize an output (e.g., output 316) from host device 308 and associate a corresponding operation required to complete a task. For example, in response to receiving an output of a draft document in Microsoft Word, ANN 314 to initiate a proofreading check. In another example, in response to receiving an output of an MRI scan, ANN 314 may initiate a first step of an analysis of the scan.

In some embodiments, ANN 314 may identify how the outputs from host device 308 (e.g., output 316) connect to one another. These connections may be based on interactions with the application that cause the application to transition from one instance to another. ANN 314 may thereby learn the architecture of the application at the level of the initial user interface design. In this example, the user interface (UI) and the intended operations of the elements of the UI may be recognition and execution pairs. In some embodiments, ANN 314 may explore information rich regions of the user interface design, as will be discussed in greater detail in relation to FIG. 4. In some embodiments, ANN 314 may receive a labeled user interface, such that a human has explicitly labeled the user interface and operation on the interface, and ANN 314 may learn with supervised recognition and execution pairs. This approach will be discussed in greater detail in relation to FIG. 6.

As shown in FIG. 3, when operating an application, the host device 308 may output an image (e.g., document, MRI scanning image, livestream, etc.). In some embodiments, client device 312 may capture the output (e.g., output 316) via HDMI 310. Client device 312 may feed output 316 from the interface into ANN 314. In some embodiments, ANN 314 may comprise various layers (e.g., input layer, hidden layer, output later), as described above in relation to FIG. 2. The system may feed various outputs into ANN 314 as user 302 navigates through an application on host device 308. In some embodiments, ANN 314 compares output 316 to previously encountered, labeled images (e.g., training data set). If ANN 314 identifies shared characteristics between output 316 and a labeled image from a training data set, ANN 314 may retrieve the label and associate the label with output 316.

In some embodiments, once ANN 314 recognizes output 316 as matching a labeled image that ANN 314 previously encountered, client device 312 may then retrieve stored keystrokes, objects, and operations associated with the labeled image. For example, there may be stored information indicating that the user typically interacts with objects on the instance by entering text into two objects and clicking on a third object. In some embodiments, client device 312 may send a command to host device 308 emulating these interactions (e.g., entering keystrokes and moving an on-screen cursor). Client device 312 may thus cause host device 308 to perform the interactions associated with the current instance of the application.

Once the system has trained ANN 314 on which operations the system performs based on outputs received from host device 308, client device 312 may perform tasks in conjunction with a human operator. For example, client device 312 may send commands to host device 308. The commands may initiate an execution step that corresponds to an output (e.g., output 316) previously received from host device 308. The command sent to host device 308 may emulate commands sent from HID 306 to host device 308 (e.g., commands received from a mouse, keyboard, microphone, touch screen, buttons, steering mechanisms, or any other interface devices). For example, the command from ANN 314 may emulate movement of an on-screen cursor, a mouse click, or a touch on a certain part of a display or touchscreen, a series of numbers and letters entered into a portion of the display, or any other interaction with host device 308. Client device 312 may send commands to host device 308 via an HDMI connection, a USB connection, a Wi-Fi connection, a Bluetooth connection, or any other wired or wireless connection.

In some embodiments, client device 312 may schedule a series of operations to perform a particular task on the host device 308, based on information ANN 314 has gathered and learned. For example, client device 312 may anticipate navigation through several layers of software interfaces to either gather or input information into the system of host device 308. In anticipation, client device 312 may buffer the chain of commands to send to host device 308 and may schedule the commands for efficient execution.

In some embodiments, client device 312 checks for asynchronous behavior of the anticipated interaction due to issues like network delays or slow execution speed of the host device and/or client device. For example, to ensure that the host device is outputting appropriate information, the client device may conduct an image-based check with the host device before executing commands. Such a check, or virtual "handshake," will ensure that the client device has up-to-date information before proceeding.

Figure 4:
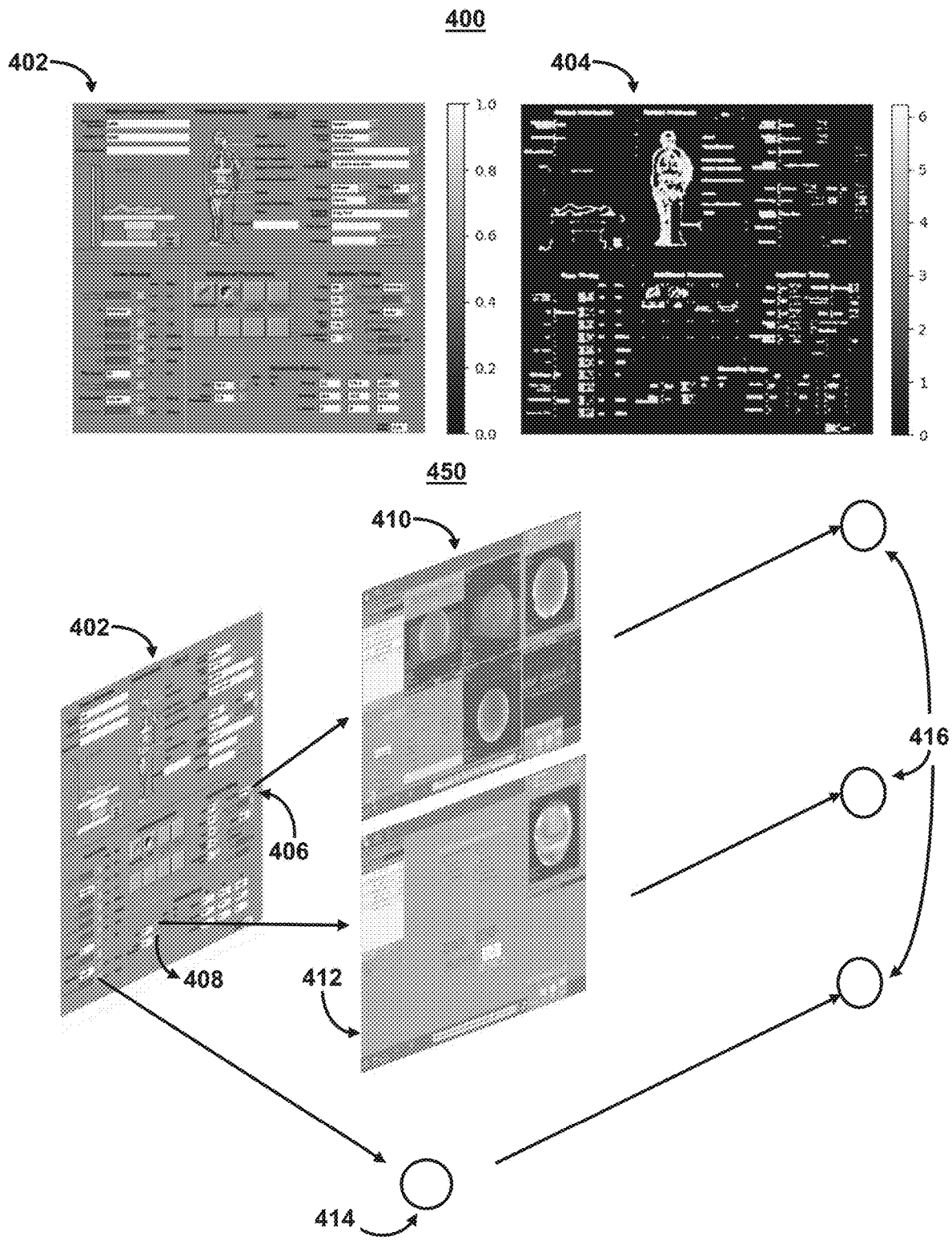
FIG. 4 shows a system for identifying information rich regions of a user interface and determining available paths through the user interface, in accordance with some embodiments.

FIG. 4 shows a system 400 for identifying information rich regions of a user interface and a system 450 for determining available paths through the user interface, in accordance with some embodiments. Many user interfaces are designed to highlight certain information, which allows a user to easily and efficiently navigate the interface. Often this information is displayed in certain information rich regions. As shown in system 400, instance 402 is a user interface of a typical GE MRI scanner. Instance 402 comprises various regions which display text, enable text input, enable alternative inputs, or link to other instances. Image 404 is a version of instance 402 in which the system has identified information rich regions (displayed in white). Identified areas include displayed text, displayed images, and links to additional instances. When training an ANN on instance 402, a client device may direct the ANN to automatically explore these information rich regions in order to determine the controls contained therein.

In some embodiments, when programming an application, a programmer may log each instance in the application and may tag the objects in each instance as well as the operations associated with each object. For example, the programmer may tag the operations associated with each object with a label and/or an indication of an instance that the application displays in response to a selection of the object. For example, if a user selects a "Log In" object, the application may transition to an account page. The programmer may store data outlining these connections between instances in memory. In some embodiments, the programmer may create a graph comprising this stored data such as the graph shown in system 450. The client device may retrieve this stored data and feed the data into the ANN. The ANN may then compare instances of the interface that it encounters when completing a task to the stored data. The ANN may therefore determine which objects to interact with to complete a task based on this stored data.

In some embodiments, in the absence of this programmer data, the ANN may build a graph showing how instances of an interface connect to other instances. As shown in system 450, interactions with various portions of instance 402 may cause the system to display alternative instances of the interface. By exploring the information rich regions of instance 402, the ANN may build the graph showing the connections between instances. For example, in response to receiving a selection from a user of portion 406 of instance 402, the application may transition to instance 410. In response to receiving a selection from a user of portion 408 of instance 402, the application may display instances 412. In response to receiving a selection of additional areas of instance 402, the application may display instances 414. Once the application displays any of instances 410, 412, or 414, the system may determine information rich regions of these new instances. The ANN may then explore these regions in order to understand how these instances link to additional instances 416.

In some embodiments, the client device and ANN may crawl the application and simulate selections of various regions (e.g., portion 406, portion 408). The client device may record the response of the application to these selections and thus build an architecture of the application. For example, the client device may simulate a selection of an object "Additional Parameters." In response, the application may display an instance including a menu of additional parameters. The client device may therefore store the object and its association with the instance in memory. Additionally or alternatively, the client device may monitor and tag the interactions of a user running an application. For example, the client device may store interactions with objects in the application and corresponding instances that the application transitions to in response to the interactions. In some embodiments, the client device may store operations to complete a given task in memory (i.e., a database). By monitoring user interactions and storing the information in memory, the client device may learn the architecture of the application without actively crawling the application.

Based on the training data indicating how each instance connects to other instances, the ANN may determine a predetermined path from the initial user interface to a final instance, within which the system completes the task. The client device may then be able to step through the various instances according to the predetermined path by emulating user interactions with each instance. For example, to complete an MRI scan, the client device may emulate user interactions with various fields on the instance in order to fill in required information and make selections. The client device sends commands to the host device to output each step as if the user were interacting with the instance. Thus, the user (i.e., human operating the MRI scanner) may follow along with the operations of the client device in completing the task.

In some embodiments, a certain task may require navigation through multiple user instances, such as those depicted in FIG. 4. For example, the client device may complete a task of performing an MRI scan. The client device may receive an output from the host device (i.e., MRI scanner) depicting a start screen. The ANN may compare the output image to stored data depicting various labeled instances of the interface and their connections (e.g., system 450). Upon identifying a match, the ANN may determine an object based on the instance which the stored data identifies as associated with the task. The ANN may therefore instruct the client device to select the object, and the client device may send a command to the host device to emulate selection of the object. Selection of the object may cause the application to transition to a second instance, and the ANN may repeat this process until it has completed the task.

In some embodiments, while the system performs operations to complete a task, the user may send input to the system. For example, input may refer to a command to stop an operation, return to a previous operation, redirect to a different operation, make a correction, or any other input. In some embodiments, the system may receive the input from the user and interpret the input by referencing a database. In some embodiments, in response to receiving the input from the user, the system may perform an action (e.g., stop an operation, return to a previous operation, redirect to a different operation, make a correction, or any other action) in accordance with the input. The user may thus manually control the operations of the system.

Figure 5:
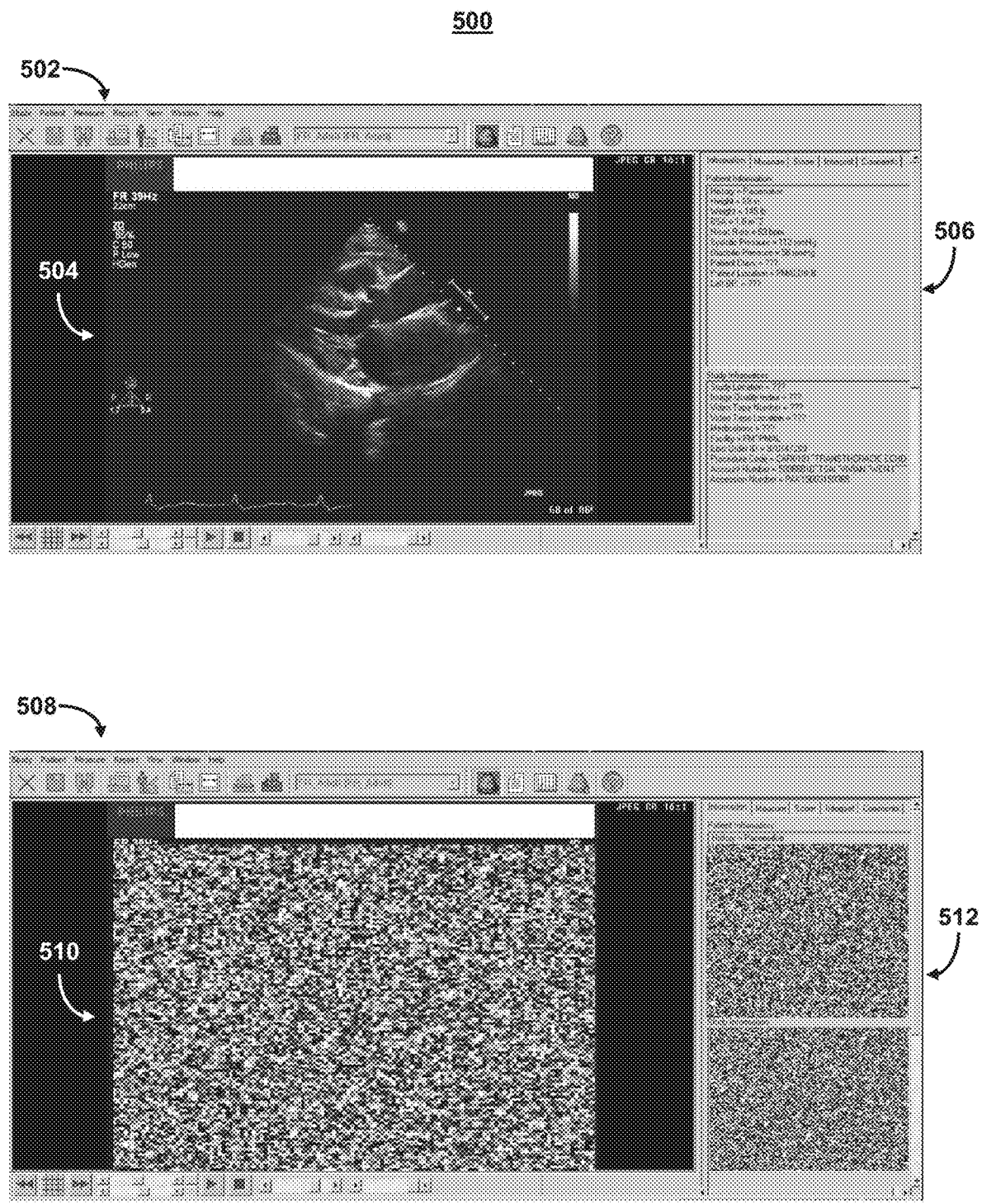
FIG. 5 shows training images of a user interface in which variable components are masked with noise, in accordance with some embodiments.

FIG. 5 shows training images of a user interface in which variable components are masked with noise, in accordance with some embodiments. When training the ANN on an application (e.g., an MRI scanner, Microsoft Word, or an autonomous car), the ANN may learn which portions of an image relate to the objects of the user interface and which portions relate to the content of the user interface. As referred to herein, the objects of the user interface include associated operations, such as scanning, proofreading, monitoring, etc. Upon selection of an object, the associated operation may be performed. In some embodiments, the objects of the user interface may be transitory or non-transitory. As referred to herein, the content of the user interface may refer to portions of the user interface which do not include an associated operation. In some embodiments, the content of the application may be variable over time. For example, content may include uploaded material, such as a scan of a heart, a typed letter, or a camera view of oncoming traffic. In some embodiments, the content may thus vary each time the application runs or may vary after a certain time period.

To train the ANN to ignore the variable content, the client device may feed labeled training data sets to the ANN in which the system has tagged variable content portions. The client device may store these labeled images for the ANN to reference. In some embodiments, the client device may feed large unlabeled data sets to the ANN, the unlabeled data sets comprising interfaces populated with both objects and content. By analyzing each image, the ANN may therefore recognize which portions of the interface vary from image to image (i.e., content) and which portions of the interface appear across many images (i.e., objects). In some embodiments, when programming an application, a programmer may insert tags defining which portions of the interface are objects and which portions are content. For example, the system may tag the scan screen, Patient Information, and Study Information portions of image 502 as content.

As shown in system 500, the MRI scanner (e.g., image 502) has received a scan (e.g., scan 504). The host device has populated certain information regions (e.g., region 506) with data regarding scan 504. Once the client device captures an image of the interface (e.g., image 508), the ANN may analyze the image. In some embodiments, the ANN may compare image 508 to labeled training data sets to identify a matching labeled image. Based on the labeled image, the ANN may identify which portion of image 508 is content. In some embodiments, the ANN may compare image 508 to a large unlabeled training data set. Based on matching image 508 to patterns across the data set (i.e., objects which may be relatively consistent across the data set and content which may vary across the data set), the ANN may identify the content portions of image 508. In some embodiments, a programmer may have tagged the MRI application to indicate which portions are objects and content. Therefore, the client device may read the tags and identify the content accordingly.

In some embodiments, once the ANN device is able to recognize content portions of an interface, the client device may mask the content portions during analysis by the ANN. For example, once the client device receives an image of an interface from a host device, the client device may mask content portions of the image based on the analysis of the ANN as described above. The client device may then feed the masked image to the ANN for analysis of the objects of the interface. As shown in FIG. 5, the client device has masked scan 510 and region 512 with noise. In some embodiments, the ANN may disregard data in a region masked with noise (i.e., content).

In some embodiments, the client device may remove the masking from the image or may opt not to mask the noise in an image. For example, the ANN may need to analyze the content of an interface (e.g., scan 510 or Word document) in addition to the objects of the interface (e.g., to process scan 510 or proofread the Word document). The ANN may therefore process the image without noise masking in order to access the content.

Figure 6:
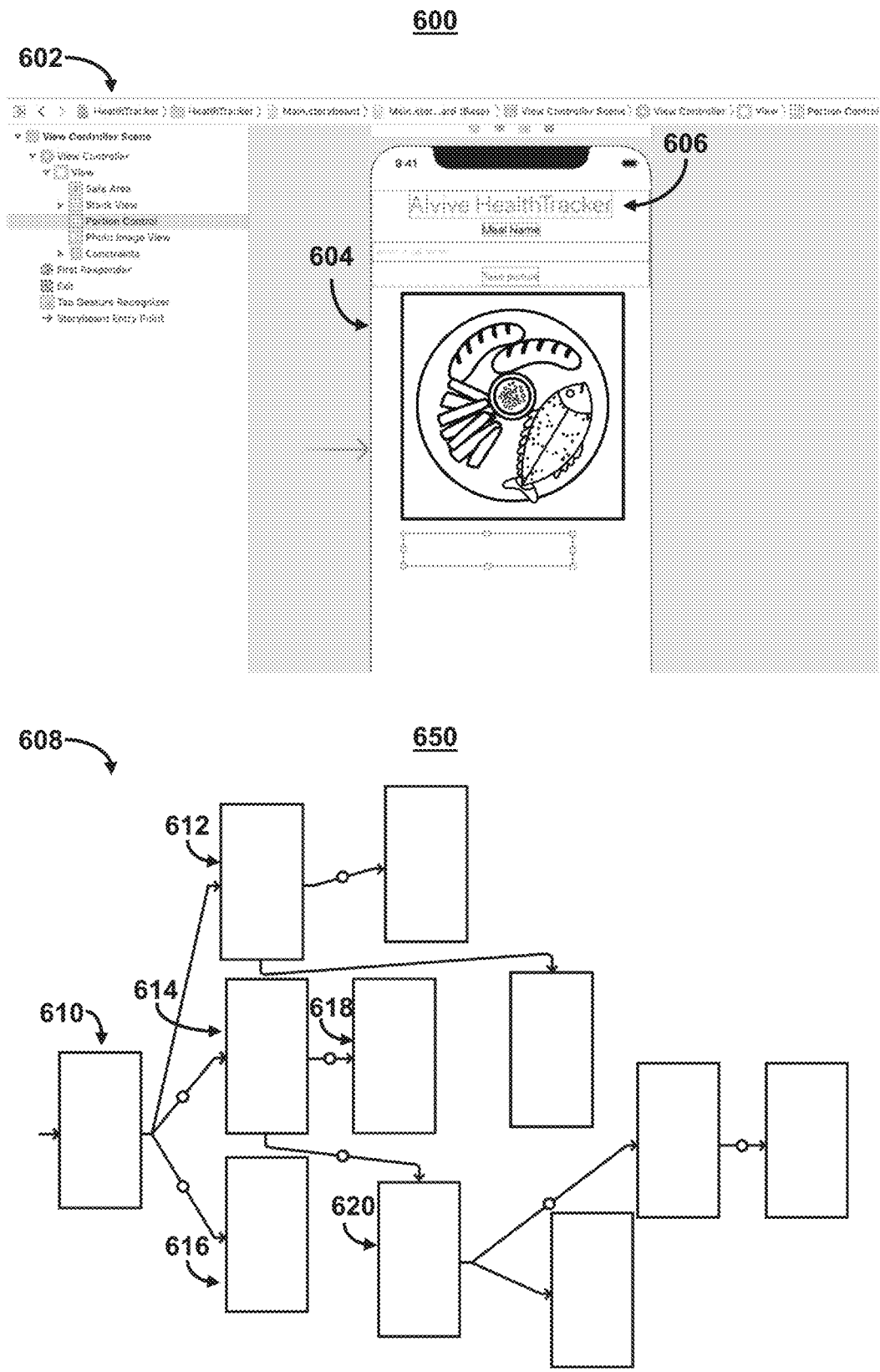
FIG. 6 shows a user interface graph with embedded image views and operations, in accordance with some embodiments.

FIG. 6 shows a user interface graph with embedded image views and operations, in accordance with some embodiments. System 600 shows a typical user integrated development environment (e.g., IDE 602). Some examples of user IDEs include XCode, Eclipse, and Android. The IDE is a tool for programmers and software developers to create and modify applications. FIG. 6 shows an IDE for a health tracking application. The current instance of the interface (e.g., instance 604) shows a screen to which a user may upload a meal name and a photograph of a meal. Object 606 also displays the name of the application, "Alvive Health-Tracker," (e.g., object 606).

Within the IDE, the developer may indicate how various instances of the interface connect to other instances. For example, when programming an application, a programmer may log each instance in the application and may tag the objects in each instance as well as the operations associated with each object. For example, the programmer may tag the operations associated with each object with a label and/or an indication of an instance that the application displays in response to a selection of the object. For example, selecting the object "Alvive HealthTracker" may cause the application to transition to a home page. The programmer may create an application graph (e.g., such as graph 608 in system 650) based on these tags. Each node in graph 608 represents an instance in the application, and various arrows illustrate how the nodes (i.e., instances) connect to other nodes. In some embodiments, the system may store graph 608 within the application and may make the graph accessible to the client device. The client device may therefore access the graph and feed the graph directly into the ANN for training. This graph may act as a roadmap for the ANN to learn the structure of the application. The ANN may thus learn the architecture directly from the programming data and may not need to build the graph independently.

In the absence of the aforementioned programming data, the system may build a graph (such as graph 608) showing connections between instances of the application. In order to determine graph 608, the client device and ANN may crawl the application and simulate selections of various regions (e.g., object 606). The client device may record the response of the application to these selections and thus build a graph of the application. For example, instance 610 may be a home screen of an application. Instance 610 may contain three links which connect to other instances. For example, instance 610 may include a menu having three options, each option linking to a different instance of the application (e.g., Social Networking, Workout Planning, and Meal Planning). The client device may simulate selecting each of these links, causing the application to display instance 612, instance 614, or instance 616, respectively. Instance 614 may include links to two other instances: Workout Scheduler and Workout Videos (e.g., instance 618 and instance 620). The client device may simulate selecting Workout Planning, causing the application to display instance 614. The client device may then simulate selecting the link for Workout Videos, which causes the application to display instance 620, from which the client device may select various exercise videos (e.g., as illustrated by various other nodes connected to instance 620). The client device may therefore store each object, along with an indication of an instance which the application displays in response to selection of the object, in memory (i.e., forming graph 608).

Additionally or alternatively, the client device may monitor and tag the interactions of a user running the application. For example, the client device may store interactions with objects in the application and the instances that the application transitions to in response to the interactions. In some embodiments, the client device may store operations which the application performs in order to complete a given task in memory (i.e., a database). By monitoring user interactions and storing the information in memory, the client device may build a graph (e.g., such as graph 608) of the application without actively crawling the application. The client device may then store the graph (e.g., graph 608) in memory.

In some embodiments, graph 608 may be a subset of the full graph showing the interconnected instances of a given application. For example, there may be many more nodes and paths present in the graph in order to capture the layout of the entire application. In some embodiments, there may be two-way paths (i.e., the instances may link to each other). In some embodiments, the paths may connect in different arrangements. For example, several chains of nodes may converge at a single node, indicating that there are various paths that lead to the same instance. Various other arrangements of nodes and paths are possible according to the architecture of the application.

In some embodiments, the client device may utilize the stored graph (e.g., graph 608) when performing a task within the application. For example, the user of the application may input a desired task to the system, wherein the task requires navigation through several instances of the interface. By identifying a node in graph 608 corresponding to the current instance being displayed (e.g., instance 610) and a node in graph 608 corresponding to the instance on which the task is to be completed (e.g., instance 618), the system may identify a path through which to complete the task. In this example, the system may navigate from instance 610 to instance 614, and from instance 614 to instance 618. Graph 608 may additionally include information regarding which objects the system may select in each instance in order to navigate between instance 610 and instance 618. Therefore, graph 608 provides the system with a road map of how to perform the task. The client device may therefore send commands to the host device to make selections of objects according to the path laid out by graph 608.

In some embodiments, while the system performs operations to complete a task, the user may send input to the system. For example, input may refer to a command to stop an operation, return to a previous operation, redirect to a different operation, make a correction, or any other input. In some embodiments, the system may receive the input from the user and interpret the input by referencing a database. In some embodiments, in response to receiving the input from the user, the system may perform an action (e.g., stop an operation, return to a previous operation, redirect to a different operation, make a correction, or any other action) in accordance with the input. The user may thus manually control the operations of the system.

FIG. 7 shows a flowchart of illustrative steps for operating computer applications based on information displayed in user interfaces, in accordance with some embodiments. Process 700 may be performed using the control circuitry of one or more components described in FIG. 1.

At step 702, process 700 receives a first image of a user interface of an application. For example, the system may populate a database of training images by capturing an image of an interface. In some embodiments, the client device may receive the first image, and the client device may be separate from the device on which the application is located. In some embodiments, the system may receive the first image via an HDMI connection (e.g., HDMI 310 of FIG. 3), a USB connection, a Wi-Fi connection, a Bluetooth connection, or any other wired or wireless connection. In some embodiments, the first image may be a screenshot or a screen grab. In some embodiments, the system may generate a first pixel array based on the first image. The pixel array may refer to computer data that describes the image (e.g., pixel by pixel). In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 704, process 700 labels (e.g., using the control circuitry of one or more components described in FIG. 1) the first image (or first pixel array) with a known instance of the user interface. For example, in order to train the artificial neural network, the system may collect numerous images of user interfaces from an application running on a device. The system may then label each image with a known instance, which corresponds to the current instance of the user interface. The current instance of the user interface may be an instance in which a menu is opened or closed, an options bar is expanded or collapsed, a pane is slid to one direction or the other, data is entered into a menu or task bar, or any other instance of an interface. The system may label each instance accordingly (e.g., "Start Screen," "Login Screen," "Menu," etc.).

At step 706, process 700 trains an artificial neural network (ANN) to detect the known instance based on the labeled first image (or labeled first pixel array). For example, as in FIG. 1, the system may feed the labeled first image into machine learning model 122 as inputs 124. As discussed in relation to FIG. 1, the artificial neural network may have classifications for different digital objects.

At step 708, process 700 receives a second image of the user interface. In some embodiments, the system may receive the second image via an HDMI connection (e.g., HDMI 310 of FIG. 3), a USB connection, a Wi-Fi connection, a Bluetooth connection, or any other wired or wireless connection. In some embodiments, the second image may be a screenshot or a screen grab. In some embodiments, the system may generate a second pixel array based on the second image.

At step 710, process 700 inputs the second image (or second pixel array) into the trained neural network (e.g., the system feeds inputs 124 into machine learning model 122). For example, the trained neural network may identify digital objects on the interface and/or information about digital objects based on the second image (or second pixel array).

At step 712, process 700 receives an output from the trained neural network (e.g., output 126 of FIG. 1) identifying the second image (or second pixel array) as corresponding to the known instance. For example, the trained neural network may output information about the known instance and/or digital objects appearing on the interface. In some embodiments, the trained neural network may generate an output identifying the second image (or second pixel array) as matching the known instance. Therefore, in some embodiments, the trained neural network may output the label for the known instance (e.g., "Start Screen," "Login Screen," "Menu," etc.).

In some embodiments, process 700 may alternatively train the artificial neural network with unsupervised data, i.e., the system may not label the known instance of the user interface. In this example, the artificial neural network may receive raw, unlabeled training images of a user interface of an application. The system may then use exploratory methods to identify information rich regions (e.g., as discussed in relation to FIG. 4) in order to identify various interface instances of the application.

In some embodiments, process 700 may label (e.g., using the control circuitry of one or more components described in FIG. 1) a location in the known instance as a noise region. In some embodiments, the system may label variable content regions (e.g., data uploaded by a user, regions that depend on the task at hand, etc.) as noise regions. In some embodiments, the system may then train the artificial neural network to disregard data in the noise region (e.g., as discussed in relation to FIG. 5).

In some embodiments, in response to receiving the output from the trained neural network, process 700 may retrieve a list of objects in the known instance and characteristics for each of the objects in the list. For example, the objects may include images, text, links, text boxes, icons, buttons, and any other objects in the known instance. In some embodiments, characteristics of each object may include whether the object is selectable, editable, movable, or able to be otherwise interacted with by a user. In some embodiments, characteristics of each object may include visual characteristics such as color, size, location, orientation, and any other visual characteristics. In some embodiments, characteristics of each object may include any other property of the objects in the known instance.

In some embodiments, process 700 may detect a user selection at a location in the first instance. For example, the user may interact with a portion of the interface corresponding to the first instance. The system may then detect that the application generates a second instance of the user interface for display in response to the user selection. In some embodiments, in response to detecting that the application generates the second instance for display in response to the user selection, the system may assign a second operation to the second object, wherein the second operation corresponds to generating for display the second instance.

Further in response to detecting that the application generates the second instance for display in response to the user selection, the system may determine that the location corresponds to a second object in the first instance. For example, the location may correspond to an image, button, link, region, or other object in the first instance. In response to determining that the location corresponds to a second object in the first instance, the system may determine a boundary of the second object in the first instance based on visual characteristics in the first instance. For example, the object may be a certain size and shape (e.g., the shape of an apple). However, the boundary of the object may extend beyond the shape (e.g., to a larger rectangle enclosing the apple). This boundary allows for a selection made slightly outside of the object (e.g., outside of the apple but within the larger rectangle) to trigger the operation associated with the object. In some embodiments, the system may additionally assign a second operation to the second object, wherein the second operation corresponds to generating for display the second instance.

In some embodiments, process 700 may label (e.g., using the control circuitry of one or more components described in FIG. 1) a node for the known instance and a path featuring the node, wherein the application has an application architecture that includes a plurality of nodes corresponding to respective instances of the application and a plurality of paths, between the plurality of nodes, for navigating between the respective instances of the application (e.g., as depicted in FIG. 6). In some embodiments the system may then train the artificial neural network to determine the node and the path based on the labeled first image. For example, the ANN may analyze the instances linked to a labeled first image (e.g., instances leading to the first image and instances accessible from the first image). The ANN may then identify the location of the node corresponding to the labeled first image within the application architecture based on the instances linked to and from the labeled first image.

In some embodiments, the steps and descriptions described in relation to FIG. 7 may take place on a second device, which connects to a first device, upon which the application runs. In some embodiments, the second device may mirror the user interface of the first device. In some embodiments, the first device and the second device may have a first input circuitry and a second input circuitry, respectively, and the first input circuitry and the second input circuitry may receive input signals from a user input device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, or features discussed in relation to FIGS. 1-6 could be used to perform one or more of the steps in FIG. 7.

FIG. 8 shows a flowchart of illustrative steps for operating computer applications based on information displayed in user interfaces, in accordance with some embodiments. Process 800 may be performed using the control circuitry of one or more components described in FIG. 1.

At step 802, process 800 receives a task, wherein the task comprises a series of operations that an operator or system may enter into a user interface of the application. In some embodiments, a task may be to print a document, run an MRI scan, or move an autonomous vehicle forward. Each of these tasks requires multiple operations, which correspond to interactions with the user interface. In some embodiments, the system may receive the task via an input signal at a human interface device such as HID 306 (e.g., a mouse, keyboard, microphone, touch screen, buttons, steering mechanisms, or any other interface device).

At step 804, process 800 determines a first operation in the series of operations. For example, in order to print a document in Microsoft Word, the first operation may be to select a "File" button. In order to run an MRI scan, the first step may be to log in to the machine. In order to move an autonomous vehicle, the first step may be to turn on a camera for viewing nearby objects.

At step 806, process 800 determines (e.g., using the control circuitry of one or more components described in FIG. 1) a first instance of the user interface that corresponds to the first operation. For example, if the first operation is to select a "File" button, the first instance of the user interface that corresponds to the first operation may be an instance in which the "File" button is visible and selectable on the user interface. If the first operation is to log into an MRI machine, the first instance of the user interface that corresponds to the first operation may be an instance in which the interface displays text boxes in which to insert a user's login credentials. In another example, if the first operation is to turn on a camera on an autonomous vehicle, the first instance of the user interface that corresponds to the first operation may be an instance in which the power button of the camera is visible and selectable on the user interface. In some embodiments, there may be multiple instances which correspond to the first operation. As an example, the "File" button may be visible and selectable in Microsoft Word regardless of which settings ribbon is visible at the time (e.g., Home, Design, Layout, Review, etc.). Each of these ribbons may represent a different instance but may still correspond to the first operation.

At step 808, process 800 receives a first image of the user interface. The client device may receive the first image. In some embodiments, the client device is separate from the device on which the application is located. In some embodiments, the system may receive the first image via an HDMI connection (e.g., HDMI 310 of FIG. 3), a USB connection, a Wi-Fi connection, a Bluetooth connection, or any other wired or wireless connection. In some embodiments, the first image may be a screenshot or a screen grab. In some embodiments, the system may generate a first pixel array based on the first image. The pixel array may refer to computer data that describes the image (e.g., pixel by pixel). In some embodiments, this may include one or more vectors, arrays, and/or matrices that represent either a Red, Green, Blue colored or grayscale images. Furthermore, in some embodiments, the system may additionally convert the image set from a set of one or more vectors, arrays, and/or matrices to another set of one or more vectors, arrays, and/or matrices. For example, the system may convert an image set having a red color array, a green color array, and a blue color to a grayscale color array.

At step 810, process 800 inputs the first image (or first pixel array) into a trained artificial neural network to identify an instance of a plurality of instances in the user interface corresponding to the first image (e.g., the system feeds inputs 124 into machine learning model 122 as depicted in FIG. 1). In some embodiments, the trained neural network may identify digital objects in the first image and/or information about the first image (or first pixel array). In some embodiments, the trained neural network may identify a match between the first image (or first pixel array) and a stored image corresponding to an instance of the plurality of instances. The system may therefore determine that the first image corresponds to the instance.

At step 812, in response to receiving an output (e.g., output 126 in FIG. 1) from the trained neural network identifying the first image as corresponding to the first instance, process 800 performs the first operation. For example, in response to receiving an indication from the trained neural network identifying the first image as a particular instance (e.g., a login screen), the system may perform a first operation (e.g., entering a user's login credentials).

In some embodiments, in order to perform the first operation, process 800 may determine a first object in the first instance corresponding to the first operation. In some embodiments, the system may determine that an interaction with a first object (e.g., an image, button, link, region, or other object) in the first instance triggers the first operation. Therefore, the system may associate the first object in the first instance with the first operation. For example, in order to turn on a camera in an autonomous vehicle, the system may identify the first image as having a power button for the camera. In some embodiments, the system may cause an on-screen cursor to move to the first object and select the first object. In this way, the system may emulate the movements of the on-screen cursor for tasks that a human would typically perform.

In some embodiments, if process 800 receives an output (e.g., output 126 of FIG. 1) from the trained neural network identifying the first image as corresponding instead to a second instance of the user interface, the system may perform a second operation, which causes the application to transition from the second instance to the first instance.

In some embodiments, process 800 may receive a time period for performing each of the series of operations. In some embodiments, the time period may be based upon an average time it takes a user to complete the operation. In some embodiments, the system may receive either a minimum or a maximum time, or both. In some embodiments, the system may perform the first operation within the time period.

In some embodiments, in response to receiving the task, the system may input the task into a database listing operations for given tasks to determine the series of operations. For example, the system may form the database of operations at the time of developing the application (as discussed in relation to FIG. 6). The database may comprise each operation, instance, object, and feature of the application. The database may also comprise information about the architecture of the application, i.e., how instances connect to other instances, how operations are related to objects, etc.

By inputting the task into the database, the system may be able to extract information related to the task and the series of operations.

In some embodiments, process 800 may receive a first image set, wherein the first image set comprises a respective image of each known instance of a series of known instances for a known task. For example, in order to complete a task, a user may need to navigate through a series of instances within an interface. The first image set may correspond to the series of instances, with one image corresponding to each instance. In some embodiments, the system may label the first image set with the known task. The system may then train the trained artificial neural network to detect the known task based on the labeled first image set. For example, the system may identify several images (e.g., "File" menu followed by "Print" menu) as an image set. The system may then detect that task "print document" is associated with these images. In some embodiments, the system may complete the task in response to recognizing several images of an image set (e.g., the first two images).

In some embodiments, process 800 may label a location in a known instance of the series of known instances for the known task as a noise region. In some embodiments, the system may label variable regions (e.g., data uploaded by a user, regions that depend on the task at hand, etc.) as noise regions. In some embodiments, the system may then train the trained artificial neural network to disregard data in the noise region.

In some embodiments, process 800 may label a respective node for each known instance of the series of known instances for the known task, wherein the application has an application architecture that includes a plurality of nodes corresponding to respective instances of the application and a plurality of paths, between the plurality of nodes, for navigating between the respective instances of the application (e.g., as depicted in FIG. 6). In some embodiments the system may then determine a second path of the plurality of paths, wherein the second path comprises one or more operations that cause the application to transition through each known instance of the series of known instances for the known task. In some embodiments, the second path may connect a series of interfaces through which a user must navigate in order to complete a task, in the proper order. This path may connect the first instance to a final instance, wherein the system completes the task at the final instance.

In some embodiments, the steps and descriptions described in relation to FIG. 8 may take place on a second device, which connects to a first device, upon which the application runs. In some embodiments, the second device may mirror the user interface of the first device. In some embodiments, the first device and the second device may have a first input circuitry and a second input circuitry, respectively, and the first input circuitry and the second input circuitry may receive input signals from a user input device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, or features discussed in relation to FIGS. 1-6 could be used to perform one or more of the steps in FIG. 8.

FIG. 9 shows a flowchart of illustrative steps for identifying objects and the operations associated with the objects in an instance of a user interface, in accordance with some embodiments. Process 900 may be performed using the control circuitry of one or more components described in FIG. 1. In some embodiments, process 900 may be a continuation of process 700.

At step 902, process 900 labels (e.g., using the control circuitry of one or more components described in FIG. 1) a first object in a known instance with a known object. In some embodiments, an object may be a digital object, such as a button, option, area, shape, image, text box, or other object. For example, if the known instance is a login screen, the known object may be a text box in which to enter login credentials. In another example, if the known instance is a camera view, the known object may be a power button for the camera. If the known instance is a Microsoft Word home page, the known object may be a "File" button.

In order to label a first object in a known instance with a known object, process 900 may retrieve a list of known objects in the known instance in response to receiving the output from the trained neural network (e.g., as in step 712 of FIG. 7). For example, a known instance (e.g., a start screen) may comprise a variety of objects (e.g., menu button, account button, video, advertisement, link to home page, etc.). In some embodiments, process 900 may then compare the first object to the known objects in the list to determine that the first object corresponds to the known object. For example, if the first object is a selectable button, the system may compare the selectable button with the known objects in the known instance (e.g., menu button, account button, video, advertisement, link to home page, etc.) to determine that the first object corresponds to the account button. Based on determining that the first object corresponds with the account button, the system may label the first object as an account button.

At step 904, process 900 trains the artificial neural network to detect the known object based on the labeled first image. For example, once the ANN recognizes the labeled first image (e.g., a start page), the ANN may identify an object (e.g., login text box) which is present on the labeled first image. In some embodiments, there may be multiple objects present in the first image. In some embodiments, the same object may appear in multiple instances of the interface.

At step 906, process 900 labels (e.g., using the control circuitry of one or more components described in FIG. 1) a first operation corresponding to a selection of the first object with a known operation. For example, a first operation corresponding to a selection of an account button may be to launch the user's account. The system may therefore label this operation with the known operation "launch account." In another example, a first operation corresponding to a selection of a button on an MRI scanner may be to load additional parameters. The system may therefore label this operation with the known operation "load parameters."

At step 908, process 900 trains the artificial neural network to detect the known operation based on the labeled first image. By recognizing an object associated with an operation, which is in turn associated with an image, the system may train the artificial neural network to detect the operation based on identifying the labeled first image. For example, once a patient's data is visible on an MRI machine, the system may train the ANN to detect the "load parameters" operation.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, or features discussed in relation to FIGS. 1-6 could be used to perform one or more of the steps in FIG. 9.

FIG. 10 shows a flowchart of illustrative steps for identifying a series of operations for performing a task, in accordance with some embodiments. Process 1000 may be performed using the control circuitry of one or more components described in FIG. 1. In some embodiments, process 1000 may be a continuation of process 800.

At step 1002, process 1000 retrieves a first node for a first instance and a second node for a second instance. In some embodiments, the first node may be a node in a graph (e.g., such as the graph depicted in FIG. 6). In some embodiments, the first instance and the second instance may be two consecutive instances presented via a user interface in the process of performing a task.

At step 1004, process 1000 determines a first path of the plurality of paths, wherein the first path comprises one or more operations that cause the application to transition from the second instance to the first instance. In some embodiments, the one or more operations that causes the application to transition from the second instance to the first instance may comprise selecting an object, selecting a link, interacting with a portion of the interface, inputting information, sending an input signal from an external device (e.g., HID 306 of FIG. 3), or any other type of operation. The one or more operations link the first instance to the second instance and thereby create a path between the first node and the second node.

At step 1006, process 1000 determines the one or more operations that cause the application to transition from the second instance to the first instance include the second operation. For example, the second operation may comprise an interaction with the interface of the second instance that causes the application to display the first instance. For example, the second operation may be an interaction with a "Home Page" link. The interaction with the home page link (e.g., via HID 306 of FIG. 3) may cause the application to display the first instance.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices, equipment, or features discussed in relation to FIGS. 1-6 could be used to perform one or more of the steps in FIG. 10.

The present techniques will be better understood with reference to the following enumerated embodiments:

1. A method comprising: receiving a first image of a user interface of an application; labeling the first image with a known instance of the user interface; training an artificial neural network to detect the known instance based on the labeled first image; receiving a second image of the user interface; inputting the second image into the trained neural network; and receiving an output from the trained neural network identifying the second image as corresponding to the known instance.

2. The method of embodiment 1, further comprising: labeling a first object in the known instance with a known object; and training the artificial neural network to detect the known object based on the labeled first image.

3. The method of embodiment 2, further comprising: labeling a first operation corresponding to a selection of the first object with a known operation; and training the artificial neural network to detect the known operation based on the labeled first image.

4. The method of embodiment 2, wherein labeling the first object in the known instance with the known object, comprises: in response to receiving the output from the trained neural network identifying the known instance in the second image, retrieving a list of known objects in the known instance; and comparing the first object to the known objects in the list to determine that the first object corresponds to the known object.

5. The method of any one of embodiments 1-4, further comprising: labeling a location in the known instance as a noise region; and training the artificial neural network to disregard data in the noise region.

6. The method of any one of embodiments 1-5, further comprising: in response to receiving the output from the trained neural network identifying the known instance in the second image, retrieving a list of objects in the known instance and characteristics for each of the objects in the list.

7. The method of any one of embodiments 1-6, further comprising: detecting a user selection at a location in the known instance; detecting that a second instance of the user interface is generated for display in response to the user selection; in response to detecting that the second instance is generated for display in response to the user selection, determining the location corresponds to a second object in the known instance; in response to determining that the location corresponds to the second object in the known instance, determining a boundary of the second object in the known instance based on visual characteristics in the known instance.

8. The method of embodiment 7, further comprising: in response to detecting that the second instance is generated for display in response to the user selection, assigning a second operation to the second object, wherein the second operation corresponds to generating for display the second instance.

9. The method of any one of embodiments 1-8, further comprising: labeling a node for the known instance and a path featuring the node, wherein the application has an application architecture that includes a plurality of nodes corresponding to respective instances of the application and a plurality of paths, between the plurality of nodes, for navigating between the respective instances of the application; and training the artificial neural network to determine the node and the path based on the labeled first image.

10. The method of any one of embodiments 1-9, further comprising: connecting a first device to a second device, wherein the application is implemented on the first device, wherein the artificial neural network is implemented on the second device; mirroring the user interface on the first device and the second device; and receiving, at first input circuitry for the first device and second input circuitry at the second device, an input signal from a user input device.

11. A method comprising: receiving a task to be completed in an application, wherein the task comprises a series of operations that are entered into a user interface of the application; determining a first operation in the series of operations; determining a first instance of the user interface that corresponds to the first operation; receiving a first image of the user interface; inputting the first image into a trained artificial neural network to identify an instance of a plurality of instances in the user interface corresponding to the first image; and in response to receiving an output from the trained neural network identifying the first image as corresponding to the first instance, performing the first operation.

12. The method of embodiment 11, further comprising: in response to receiving an output from the trained neural network identifying the first image as corresponding to a second instance of the user interface, performing a second operation, wherein the second operation causes the application to transition from the second instance to the first instance.

13. The method of embodiment 12, wherein performing the second operation comprises: retrieving a first node for the first instance and a second node for the second instance, wherein the application has an application architecture that includes a plurality of nodes corresponding to respective instances of the application and a plurality of paths, between the plurality of nodes, for navigating between the respective instances of the application; determining a first path of the plurality of paths, wherein the first path comprises one or more operations that cause the application to transition from the second instance to the first instance; determining the second operation is included in the one or more operations that cause the application to transition from the second instance to the first instance.

14. The method of any one of embodiments 11-13, further comprising: receiving a time period for performing each of the series of operations; and performing the first operation within the time period.

15. The method of any one of embodiments 11-14, wherein performing the first operation comprises: determining a first object in the first instance corresponding to the first operation; causing an on-screen cursor to move to the first object; and selecting the first object with the on-screen cursor.

16. The method of any one of embodiments 11-15, further comprising: in response to receiving the task, inputting the task into a database listing operations to be performed for given tasks to determine the series of operations.

17. The method of any one of embodiments 11-16, further comprising: receiving a first image set, wherein the first image set comprises a respective image of each known instance of a series of known instances for a known task; labeling the first image set with the known task; and training the trained artificial neural network to detect the known task based on the labeled first image set.

18. The method of embodiment 17, further comprising: labeling a location in a known instance of the series of known instances for the known task as a noise region; and training the trained artificial neural network to disregard data in the noise region.

19. The method of embodiment 17, further comprising: labeling a respective node for each known instance of the series of known instances for the known task, wherein the application has an application architecture that includes a plurality of nodes corresponding to respective instances of the application and a plurality of paths, between the plurality of nodes, for navigating between the respective instances of the application; and determining a second path of the plurality of paths, wherein the second path comprises one or more operations that cause the application to transition through each known instance of the series of known instances for the known task.

20. The method of any one of embodiments 11-19, further comprising: connecting a first device to a second device, wherein the application is implemented on the first device, wherein the trained artificial neural network is implemented on the second device; mirroring the user interface on the first device and the second device; and receiving, at first input circuitry for the first device and second input circuitry at the second device, an input signal from a user input device.

21. A tangible, non-transitory, machine-readable medium storing instructions that, when executed by a data processing apparatus, cause the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

23. A system comprising means for performing one or more of the steps of embodiments 1-20.

What is claimed is:

1. A system for operating computer applications in an integrated development environment ("IDE") based on information labeled in user interfaces, the system comprising:
    memory configured to store a plurality of instances of a user interface; and
    control circuitry configured to:
    receive a first image of the user interface of an application, wherein the first image corresponds to an image presented on the user interface of the application when human operators perform a first operation of a series of operations that are entered into the user interface of the application, using a user input device, to perform a task;
    assign a label to the first image with a known instance of the user interface, wherein the label comprises a metadata log that indicates:
    (i) how other instances of the user interface connect to the known instance;
    (ii) an object in the known instance; and
    (iii) an operation associated with the object;
    train an artificial neural network to detect the known instance based on the first image and the label;
    receive a task to be completed in the application, wherein the task comprises the series of operations that are entered into the user interface of the application;
    determine the first operation in the series of operations;
    determine the first operation corresponds to the known instance of the user interface;
    receive a second image of the user interface;
    input the second image into the artificial neural network;
    receive an output from the artificial neural network identifying the second image as corresponding to the known instance; and
    in response to receiving the output from the artificial neural network identifying the first image as corresponding to the known instance, automatically perform, by the artificial neural network, the first operation, wherein the first operation compromises automatically interacting with the known instance of the user interface.

2. A method of operating computer applications in an integrated development environment ("IDE") based on information displayed in user interfaces, the method comprising:
    receiving, using control circuitry, a first image of a user interface of an application, wherein the first image corresponds to an image presented on the user interface of the application while human operators perform a first operation of a series of operations that are entered into the user interface of the application, using a user input device, to perform a task;

assigning, using the control circuitry, a label to the first image with a known instance of the user interface, wherein the label comprises a metadata log that indicates:
(i) how other instances of the user interface connect to the known instance;
(ii) an object in the known instance; and
(iii) an operation associated with the object;
receiving, using the control circuitry, a second image of the user interface;
inputting, using the control circuitry, the second image into an artificial neural network, wherein the artificial neural network is trained to detect the known instance based on the first image and the label;
receiving, using the control circuitry, an output from the artificial neural network identifying the second image as corresponding to the known instance; and
in response to receiving the output from the artificial neural network, identifying the first image as corresponding to the known instance, automatically performing, by the artificial neural network, the operation, wherein the first operation comprises automatically interacting with the known instance of the user interface.

3. The method of claim 2, further comprising:
labeling, using the control circuitry, a first object in the known instance with a known object; and
training, using the control circuitry, the artificial neural network to detect the known object based on the first image and the label.

4. The method of claim 3, further comprising:
labeling, using the control circuitry, a first operation corresponding to a selection of the first object with a known operation; and
training, using the control circuitry, the artificial neural network to detect the known operation based on the first image and the label.

5. The method of claim 3, wherein labeling the first object in the known instance with the known object, comprises:
in response to receiving the output from the artificial neural network identifying the known instance in the second image, retrieving a list of known objects in the known instance; and
comparing the first object to the list of known objects to determine that the first object corresponds to the known object.

6. The method of claim 2, further comprising:
labeling, using the control circuitry, a location in the known instance as a noise region; and
training, using the control circuitry, the artificial neural network disregard data in the noise region.

7. The method of claim 2, further comprising:
in response to receiving the output from the artificial neural network identifying the known instance in the second image, retrieving a list of objects in the known instance and characteristics for each object in the list of objects.

8. The method of claim 2, further comprising:
detecting a user selection at a location in the known instance;
detecting that a second instance of the user interface is generated for display in response to the user selection;
in response to detecting that the second instance is generated for display in response to the user selection, determining the location corresponds to a second object in the known instance; and
in response to determining that the location corresponds to the second object in the known instance, determining a boundary of the second object in the known instance based on visual characteristics in the known instance.

9. The method of claim 8, further comprising:
in response to detecting that the second instance is generated for display in response to the user selection, assigning a second operation to the second object, wherein the second operation corresponds to generating for display the second instance.

10. The method of claim 2, further comprising:
labeling, using the control circuitry, a node for the known instance and a path featuring the node, wherein the application has an application architecture that includes a plurality of nodes corresponding to respective instances of the application and a plurality of paths, between the plurality of nodes, for navigating between the respective instances of the application; and
training, using the control circuitry, the artificial neural network to determine the node and the path based on the first image and the label.

11. The method of claim 2, further comprising:
connecting a first device to a second device, wherein the application is implemented on the first device, wherein the artificial neural network is implemented on the second device;
mirroring the user interface on the first device and the second device; and
receiving, at first input circuitry for the first device and second input circuitry at the second device, an input signal from a user input device.

12. A non-transitory, machine-readable medium storing instructions for operating computer applications in an integrated development environment ("IDE") based on information displayed in user interfaces that, when executed by a data processing apparatus, cause the data processing apparatus to perform operations comprising:
receiving a first image of a user interface of an application, wherein the first image corresponds to an image presented on the user interface of the application while human operators perform a first operation of a series of operations that are entered into the user interface of the application, using a user input device, to perform a task;
assigning a label to the first image with a known instance of the user interface, wherein the label comprises a metadata log that indicates:
(i) how other instances of the user interface connect to the known instance;
(ii) an object in the known instance; and
(iii) an operation associated with the object;
receiving a second image of the user interface;
inputting the second image into an artificial neural network, wherein the artificial neural network is trained to detect the known instance based on the first image and the label;
receiving an output from the artificial neural network identifying the second image as corresponding to the known instance; and
in response to receiving the output from the artificial neural network identifying the first image as corresponding to the known instance, automatically performing, by the artificial neural network, the operation, wherein the first operation comprises automatically interacting with the known instance of the user interface.

13. The non-transitory, machine-readable medium of claim 12, further comprising instructions that cause the data processing apparatus to perform operations comprising:
  labeling a first object in the known instance with a known object; and
  training the artificial neural network to detect the known object based on the first image and the label.

14. The non-transitory, machine-readable medium of claim 13,
  further comprising instructions that cause the data processing apparatus to perform operations comprising:
  labeling a first operation corresponding to a selection of the first object with a known operation; and
  training the artificial neural network to detect the known operation based on the first image and the label.

15. The non-transitory, machine-readable medium of claim 13, wherein labeling the first object in the known instance with the known object, further comprises:
  in response to receiving the output from the artificial neural network identifying the known instance in the second image, retrieving a list of known objects in the known instance; and
  comparing the first object to the list of known objects to determine that the first object corresponds to the known object.

16. The non-transitory, machine-readable medium of claim 12, further comprising instructions that cause the data processing apparatus to perform operations comprising:
  labeling a location in the known instance as a noise region; and
  training the artificial neural network to disregard data in the noise region.

17. The non-transitory, machine-readable medium of claim 12, further comprising instructions that cause the data processing apparatus to perform operations comprising:
  in response to receiving the output from the artificial neural network identifying the known instance in the second image, retrieving a list of objects in the known instance and characteristics for each object in the list of objects.

18. The non-transitory, machine-readable medium of claim 12, further comprising instructions that cause the data processing apparatus to perform operations comprising:
  detecting a user selection at a location in the known instance;
  detecting that a second instance of the user interface is generated for display in response to the user selection;
  in response to detecting that the second instance is generated for display in response to the user selection, determining the location corresponds to a second object in the known instance; and
  in response to determining that the location corresponds to the second object in the known instance, determining a boundary of the second object in the known instance based on visual characteristics in the known instance.

19. The non-transitory, machine-readable medium of claim 18, further comprising instructions that cause the data processing apparatus to perform operations comprising:
  in response to detecting that the second instance is generated for display in response to the user selection, assigning a second operation to the second object, wherein the second operation corresponds to generating for display the second instance.

20. The non-transitory, machine-readable medium of claim 12, further comprising instructions that cause the data processing apparatus to perform operations comprising:
  labeling a node for the known instance and a path featuring the node, wherein the application has an application architecture that includes a plurality of nodes corresponding to respective instances of the application and a plurality of paths, between the plurality of nodes, for navigating between the respective instances of the application; and
  training the artificial neural network to determine the node and the path based on the first image.

* * * * *